United States Patent
Kang et al.

(10) Patent No.: US 11,939,232 B2
(45) Date of Patent: Mar. 26, 2024

(54) WATER PURIFIER

(71) Applicant: SAMSUNG ELECTRONICS CO., LTD., Suwon-si (KR)

(72) Inventors: Wanku Kang, Suwon-si (KR); Minkyu Kim, Suwon-si (KR); Junggeun Lee, Suwon-si (KR); Jongho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 17/159,529

(22) Filed: Jan. 27, 2021

(65) Prior Publication Data

US 2021/0230015 A1 Jul. 29, 2021

(30) Foreign Application Priority Data

Jan. 28, 2020 (KR) .................. 10-2020-0009630

(51) Int. Cl.
*C02F 1/00* (2023.01)
*B01D 35/30* (2006.01)

(52) U.S. Cl.
CPC ............. *C02F 1/003* (2013.01); *B01D 35/30* (2013.01); *C02F 2307/10* (2013.01)

(58) Field of Classification Search
CPC ...... C02F 1/003; C02F 2307/10; B01D 35/04; B67D 1/06; B67D 2210/00031
See application file for complete search history.

(56) References Cited

U.S. PATENT DOCUMENTS

| | | | |
|---|---|---|---|
| 11,279,610 B2* | 3/2022 | Jeon ....................... | E03C 1/0401 |
| 2007/0251590 A1 | 11/2007 | Weinstein | |
| 2019/0016607 A1* | 1/2019 | Jeong ................... | B67D 3/0061 |
| 2019/0060803 A1* | 2/2019 | Jeon ....................... | B01D 35/303 |
| 2021/0002117 A1* | 1/2021 | Park ........................ | F16H 19/04 |

FOREIGN PATENT DOCUMENTS

| | | |
|---|---|---|
| CN | 205013848 U | 2/2016 |
| KR | 10-2010-0039770 A | 4/2010 |
| KR | 10-2018-0063657 A | 6/2018 |
| KR | 10-1901615 | 9/2018 |
| KR | 10-1948726 | 2/2019 |
| KR | 10-2019-0087966 | 7/2019 |
| WO | 2012/138316 A1 | 10/2012 |

OTHER PUBLICATIONS

International Search Report dated May 20, 2021 from International Application No. PCT/KR2021/001153.

* cited by examiner

*Primary Examiner* — Benjamin M Kurtz
(74) *Attorney, Agent, or Firm* — STAAS & HALSEY LLP

(57) ABSTRACT

Provided is a water purifier capable of freely changing a water outlet position, the water purifier including a water purifier body, a water outlet unit connected to the water purifier body, and including a manipulator configured to control the water purifier body and a water outlet nozzle configured to supply clean water to an outside of the water purifier body in connection with the manipulator, and a rotating device provided between the water purifier body and the water outlet unit and configured to rotate the water outlet unit, wherein the rotating device includes a fixed bracket and a rotating bracket provided to rotate relative to the fixed bracket to rotate the water outlet unit.

10 Claims, 16 Drawing Sheets

WATER PURIFIER

CROSS-REFERENCE TO RELATED APPLICATION

This application is based on and claims priority under 35 U.S.C. § 119 to Korean Patent Applications No. 10-2020-0009630, filed on Jan. 28, 2020 in the Korean Intellectual Property Office, the disclosures of which are incorporated herein by reference.

BACKGROUND

1. Field

The disclosure relates to a water purifier, and more specifically, to a water purifier capable of variously changing the position of a water outlet unit.

2. Description of the Related Art

A water purifier is a device that provides a user with drinking water by removing harmful substances contained in raw water, such as tap water or ground water, through various purification methods, such as precipitation, filtration, and sterilization. The water purifier is provided to supply clean water to a user by filtering incoming water using one or more water filters.

Recently, there has been development of a water purifiers having a small size and installable in various installation environments.

In general, a water purifier may include a main body forming the external appearance thereof, and a water outlet provided at an upper portion of the main body to discharge drinking water. The water outlet is provided at an upper end portion of the main body so that a user is supplied with purified water.

The existing water purifier may have the water outlet fixed to the main body, or installed at a set angle of rotation in a clockwise or counterclockwise direction.

Accordingly, the user needs to arbitrarily set the water outlet to suit the installation position of the water purifier, but the limited rotation angle of the water outlet may restrict the installation position, and lead to inconvenience in use.

SUMMARY

According to an aspect of the disclosure, there is provided a water purifier including: a water purifier body; a water outlet unit connected to the water purifier body, and including a manipulator configured to control the water purifier body and a water outlet nozzle configured to supply clean water to an outside of the water purifier body in connection with the manipulator; and a rotating device provided between the water purifier body and the water outlet unit and configured to rotate the water outlet unit, wherein the rotating device includes: a fixed bracket; and a rotating bracket provided to rotate relative to the fixed bracket to rotate the water outlet unit.

The water outlet unit may include a case provided to cover the rotating device; and an adjusting device installed inside the case and configured to adjust a height of the water outlet unit.

The fixed bracket may include: a rotation support portion formed in a ring shape and provided to be fixed to a counterpart object; and a rotation guide extending from the rotation support portion and provided to guide rotation of the rotating bracket.

The rotating bracket may include a rotating body formed with a rotation groove corresponding to the rotation guide.

The rotating body may include a contact portion formed to protrude to make a line or point friction with the rotation guide.

The adjusting device may include: a moving bracket connected to at least a portion of the case; and a driving portion provided to move the moving bracket upward and downward.

The water purifier may further include a connecting bracket connecting the case to the moving bracket, wherein the connecting bracket may be configured to cause the case to move upward and downward in connection with the upward and downward movement of the moving bracket.

The water purifier may further include a position fixing portion provided to keep the moving bracket in position, wherein the position fixing portion may include a holder elastically installed on the moving bracket and a holder hole corresponding to the holder and provided to fixedly separate the moving bracket from the rotating bracket.

The position fixing portion may include a first fixing portion configured to fixedly separate the moving bracket from the rotating bracket at a first position, and a second fixing portion configured to fixedly separate the moving bracket from the rotating bracket at a second position spaced apart from the first position, wherein the first fixing portion may be provided below the second fixing portion.

The driving portion may include a first gear portion provided on the moving bracket and a second gear portion provided on the rotating bracket to be engaged with the first gear portion.

The driving portion may further include a damper configured to adjust a moving speed of the moving bracket.

The driving portion may further include a guide correlated with each of the moving bracket and the rotating bracket to guide the upward and downward movement of the moving bracket.

The driving portion may further include a roller configured to guide the upward and downward movement of the moving bracket.

The water purifier may further include a stopper configured to limit the rotation of the rotating bracket.

The water purifier body may include a filter unit including at least one filter, and a heat exchange unit connected to the filter unit to cool or heat purified water.

According to another aspect of the disclosure, there is provided a water purifier including: a water purifier body including a filter unit including at least one filter and a heat exchange unit connected to the filter unit to cool or heat purified water; a water outlet unit connected to the water purifier body, and including a manipulator configured to control the water purifier body and a water outlet nozzle configured to supply clean water to an outside of the water purifier body in connection with the manipulator; and a rotating device provided between the water purifier body and the water outlet unit, and configured to rotate the water outlet unit, wherein the rotating device includes: a fixed bracket; a rotating bracket provided to rotate relative to the fixed bracket, and configured to rotate the water outlet unit; and an adjusting device installed inside the rotating bracket to be movable upward and downward to adjust a height of the water outlet unit.

The fixed bracket may include: a rotation support portion formed in a ring shape and provided to be fixed to a counterpart object; and a rotation guide extending from the rotation support portion and provided to guide rotation of the rotating bracket.

The rotating bracket may include a rotating body formed with a rotation groove corresponding to the rotation guide.

The adjusting device may include: a moving bracket connected to at least a portion of the water outlet unit; and a driving portion configured to move the moving bracket upward and downward.

The water purifier may further include a position fixing portion provided to keep the moving bracket in position, wherein the position fixing portion may include a holder elastically installed on the moving bracket and at least one holder hole corresponding to the holder and formed at different heights to fixedly separate the moving bracket from the rotating bracket.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
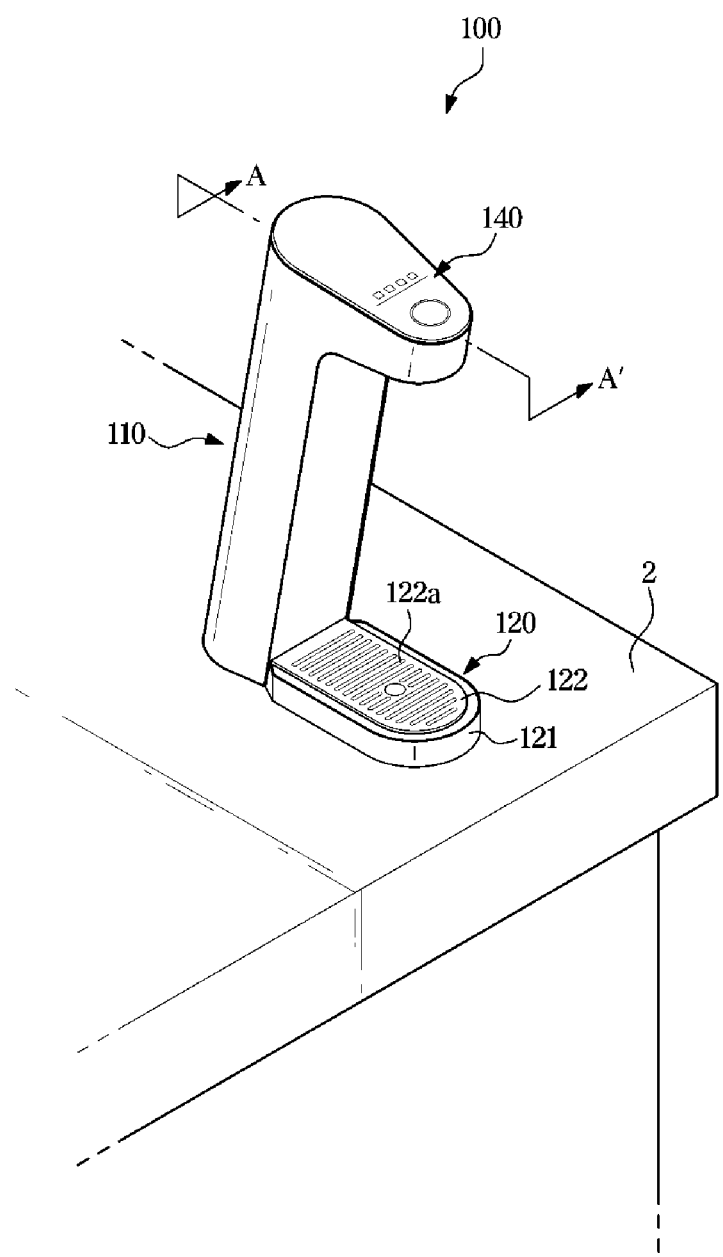
FIG. 1 is a view illustrating a water outlet unit of a water purifier according to an embodiment of the disclosure.

The embodiments set forth herein and illustrated in the configuration of the disclosure are only the most preferred embodiments and are not representative of the full the technical spirit of the disclosure, so it should be understood that they may be replaced with various equivalents and modifications at the time of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Hereinafter, embodiments of the disclosure will be described in detail with reference to the accompanying drawings.

Therefore, it is an object of the disclosure to provide a water purifier capable of freely changing the position of a water outlet unit and a residual water tray.

It is another object of the disclosure to provide a water purifier capable of adjusting ascending/descending and rotation of a water outlet unit.

It is another object of the disclosure to provide a water purifier capable of improving the usability and durability of a product by smoothing the rotation of a water outlet unit of the water purifier.

Figure 2:
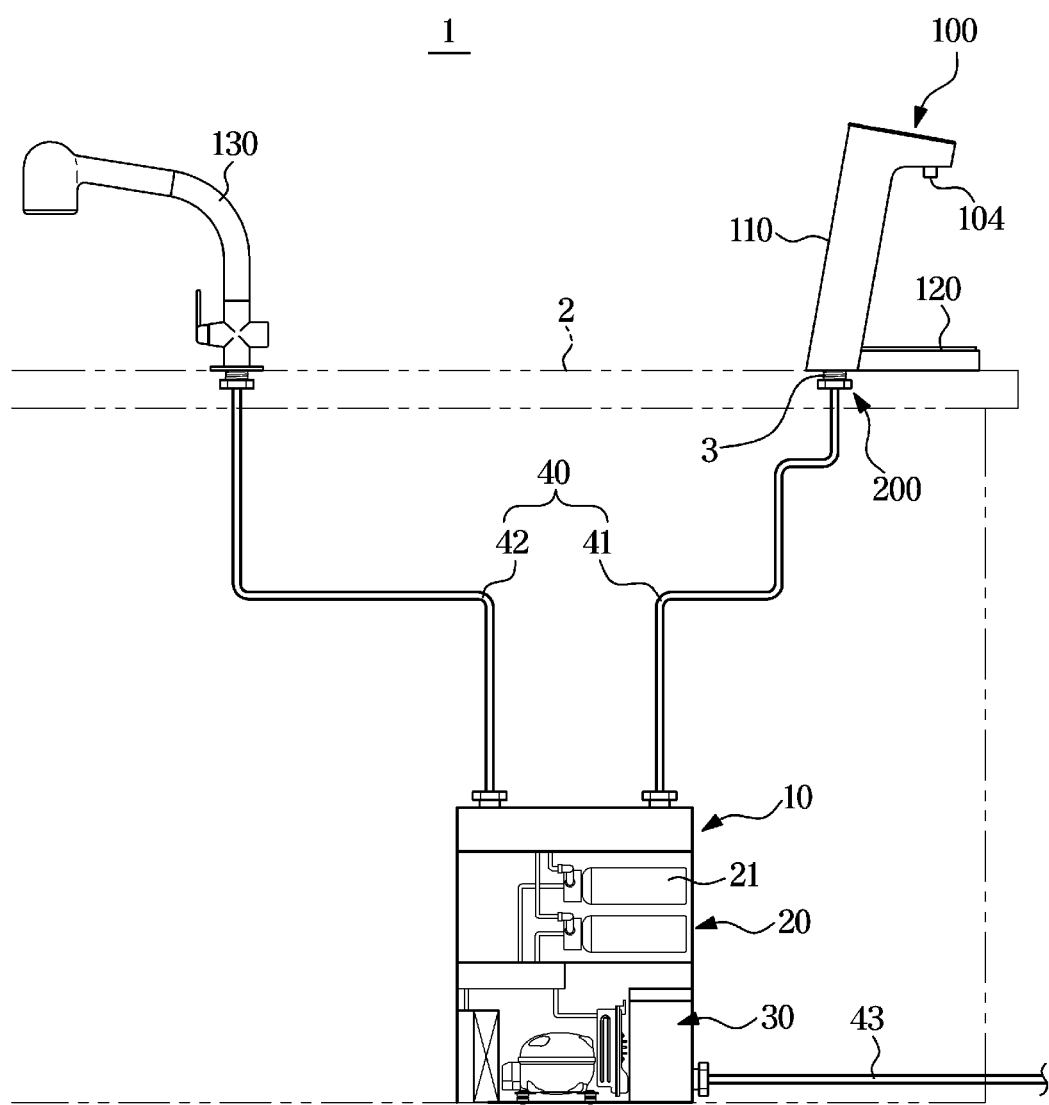
FIG. 2 is a view schematically illustrating the water purifier according to the embodiment of the disclosure.
Figure 3:
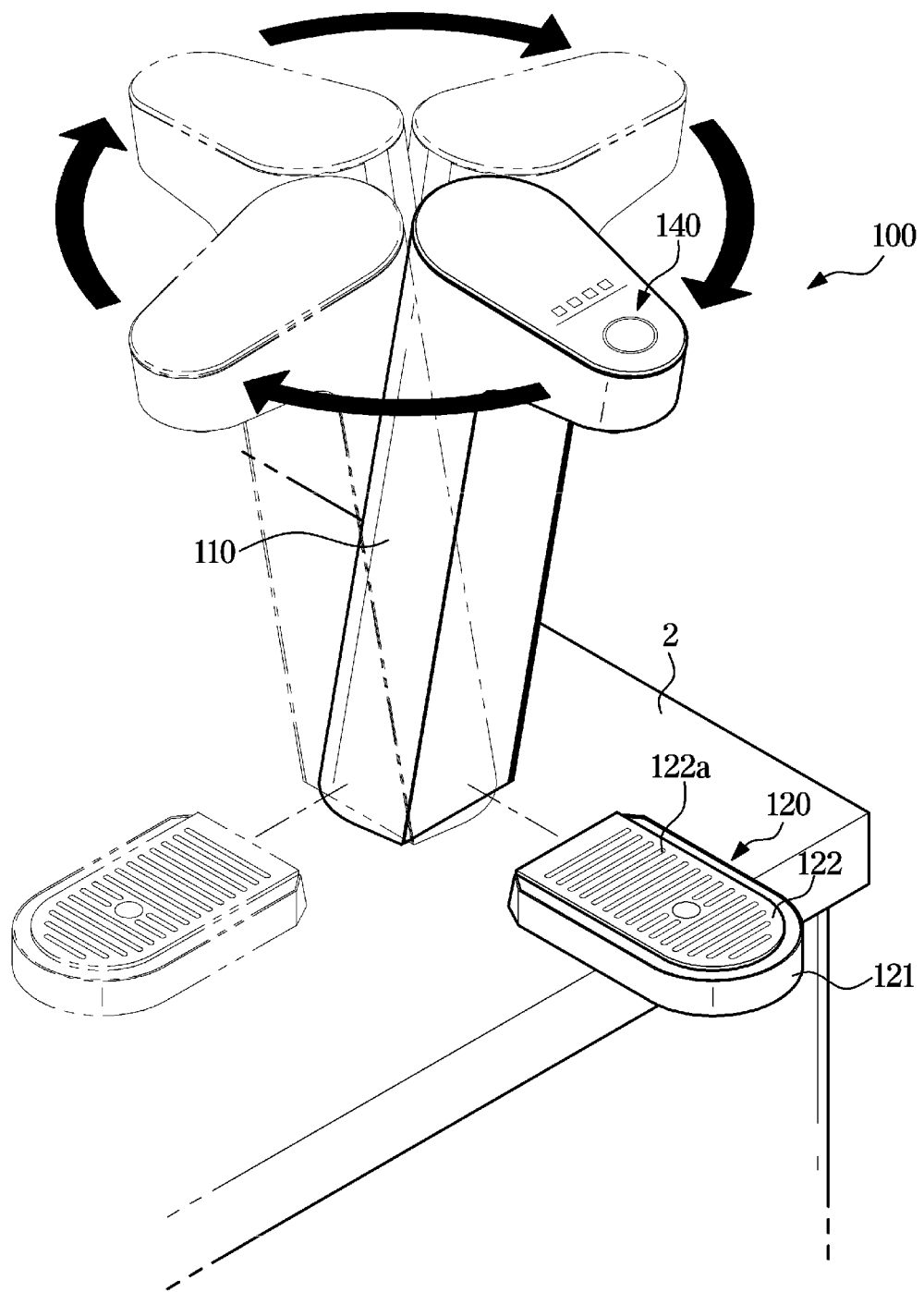
FIG. 3 is a perspective view illustrating a state in which the position of the water outlet unit of the water purifier is shifted according to the embodiment of the disclosure.

It is another object of the disclosure to provide a water purifier capable of limiting wear of parts occurring due to rotation of a water outlet unit. FIG. 1 is a view illustrating a water outlet unit of a water purifier according to an embodiment of the disclosure, FIG. 2 is a view schematically illustrating the water purifier according to the embodiment of the disclosure, and FIG. 3 is a perspective view illustrating a state in which the position of the water outlet unit of the water purifier is shifted according to the embodiment of the disclosure;

Referring to FIGS. 1 to 3, a water purifier 1 may include a water purifier body 10 and a water outlet unit 100 connected to the water outlet unit 10 and including a water outlet nozzle 104 configured to supply clean water to the outside of the water purifier body 10. The water purifier 1 may include the water purifier body 10 disposed below a kitchen worktable 2 and the water outlet unit 100 disposed above the kitchen worktable 2.

The water outlet unit 100 may be installed above the kitchen worktable 2. The water outlet unit 100 may be rotatably installed above the kitchen worktable 2. The water outlet unit 100 may be connected to the water purifier body 10 through a connecting member 40.

The water purifier body 10 may be disposed inside the kitchen worktable 2. The water purifier body 10 includes a filter unit 20 including at least one filter 21, and a heat exchange unit 30 provided to cool or heat water purified by the filter unit 20. Although not shown, the heat exchange unit 30 may include a refrigeration cycle device including a compressor, a condenser, an expansion valve, and an evaporator, and a heater.

The water purifier body 10 may be supplied with raw water, such as tap water, through an external pipe 43.

The connecting member 40 connected to the water purifier body 10 may include one or more pipes 41 and 42. The pipes 41 and 42 may include a first pipe 41 connected to the water outlet unit 100 and a second pipe 42 connected to a faucet 130 installed in a kitchen sink (not shown).

The kitchen worktable 2 may be provided with an installation portion 3 on which the water outlet unit 100 is installed. The installation portion 3 may be provided as an opening formed in at least a portion of the kitchen worktable 2. The first pipe 41 and the water outlet unit 100 may be connected to each other through the installation portion 3 of the kitchen worktable 2.

The water outlet unit 100 may be rotatably installed on the installation portion 3. The water outlet unit 100 may be installed on the installation portion 3 so as to be rotated through a rotating device 200.

In the embodiment of the disclosure, the installation portion is illustrated as being formed near the corner of the kitchen worktable, but the scope of the disclosure is not limited thereto. For example, the installation portion may be formed at various positions where the water outlet unit of the water purifier is installed.

The water outlet unit 100 includes a case 110 forming the external appearance thereof. The case 110 may include a manipulation unit 140 provided to control the water purifier body 10, and a water outlet nozzle 104 that receives purified water from the water purifier body 10 in connection with the manipulation unit 140 and provides a user with the received water.

The water outlet unit 100 may further include a residual water tray 120 that is provided separately from the case 110. The residual water tray 120 may be provided to prevent some of the water discharged from the water outlet nozzle 104 of the water outlet unit 100 from flowing out of a cup or bowl of a user.

The residual water tray 120 may include a tray body 121 formed as a depression to store outflowing water, and a tray grille 122 provided on the tray body 121. The tray grille 122 may include a plurality of slits 122a formed as openings into which water flowing out of a cup or bowl may be introduced.

The residual water tray 120 is provided to be movable independent of the rotation of the water outlet unit 100. The residual water tray 120 may be provided to be detachable from the case 110 of the water outlet unit 100. The residual water tray 120 may be provided at a position corresponding to that of the water outlet nozzle 104 of the water outlet unit 100. The residual water tray 120 may be disposed below the water outlet nozzle 104. The residual water tray 120 may be provided to have at least one surface thereof mounted on the case 110. The residual water tray 120 may be provided to have at least one surface thereof attached to the front surface of the case 110.

Figure 4:
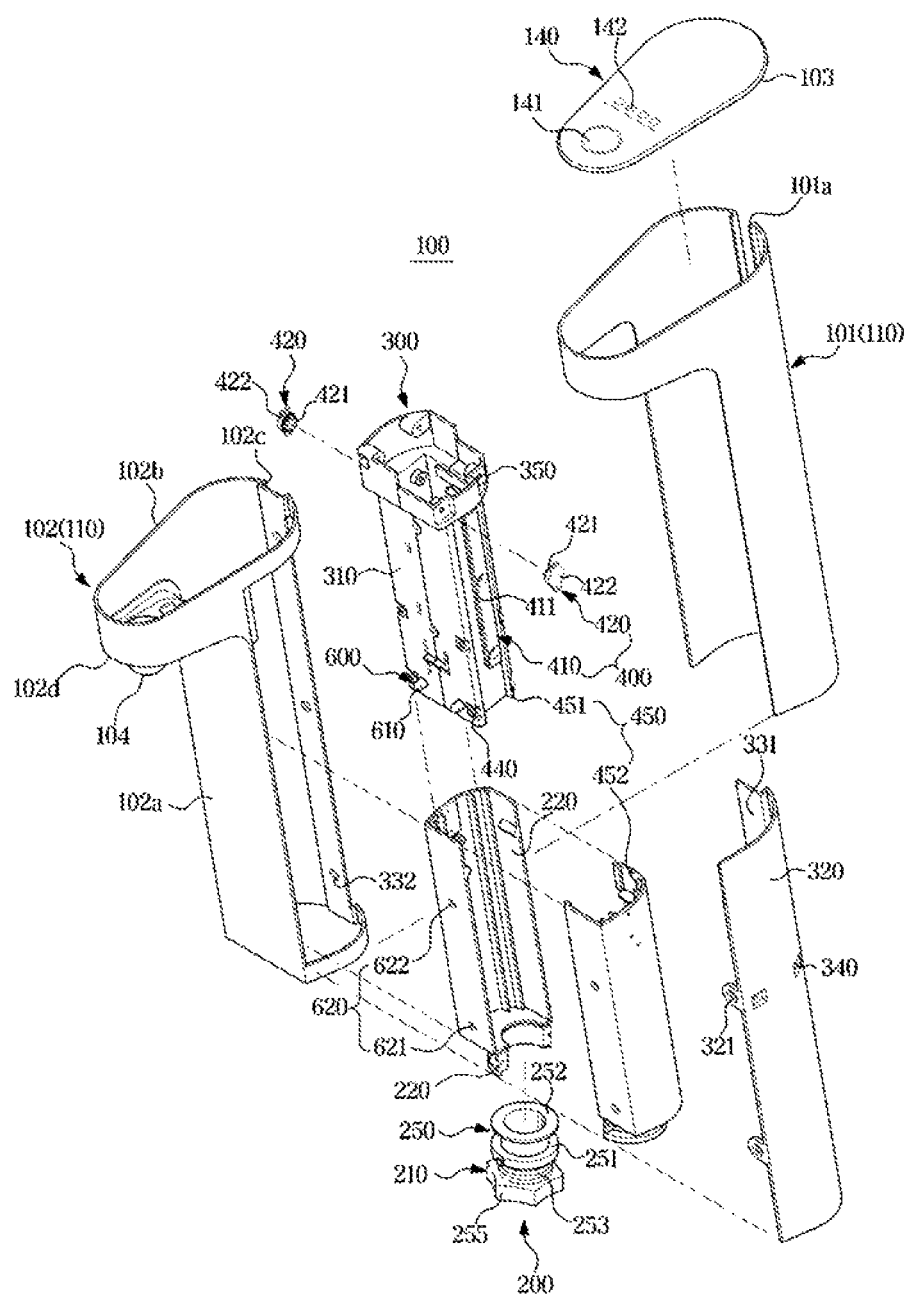
FIG. 4 is an exploded perspective view illustrating the water outlet unit according to the embodiment of the disclosure.
Figure 5:
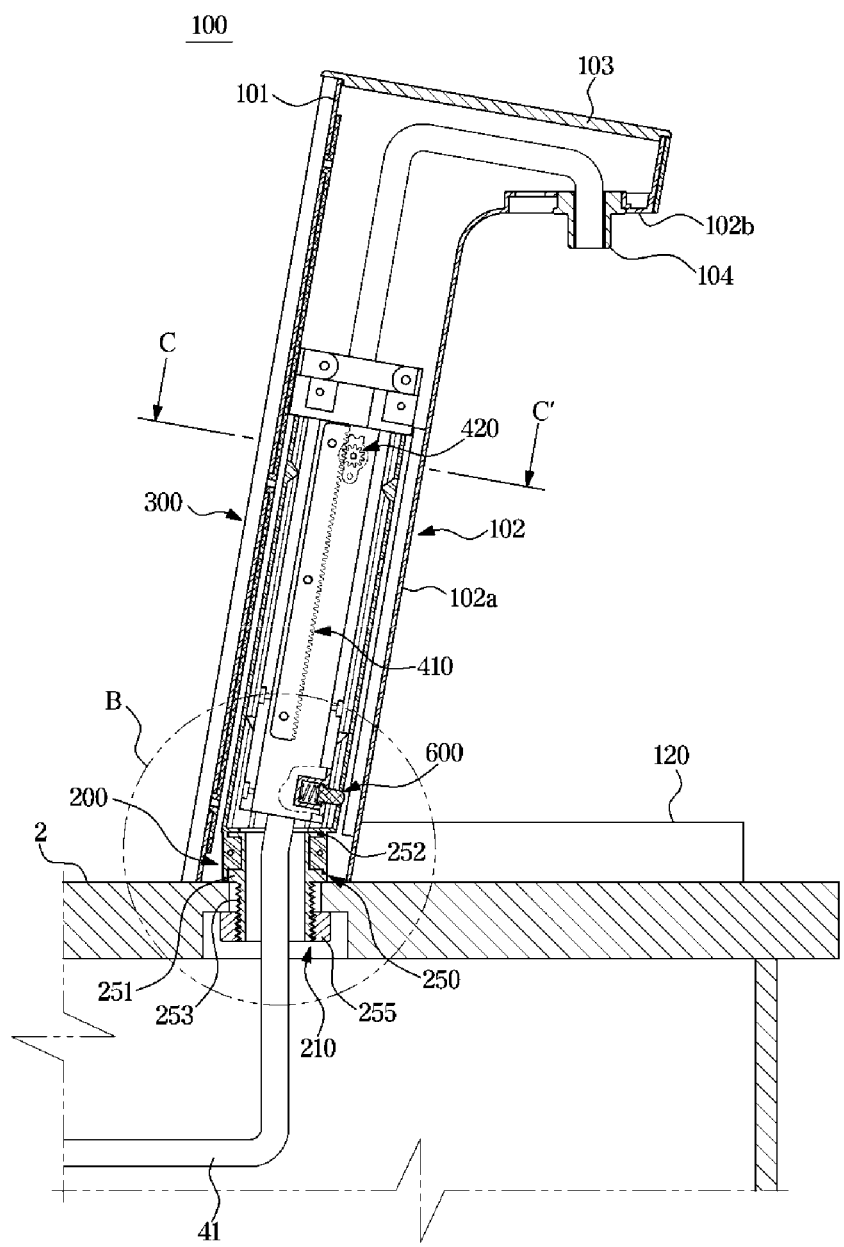
FIG. 5 is a cross-sectional view taken along line A-A' of FIG. 2, which shows a cross-section of the water outlet unit of the water purifier according to the embodiment of the disclosure.
Figure 6:
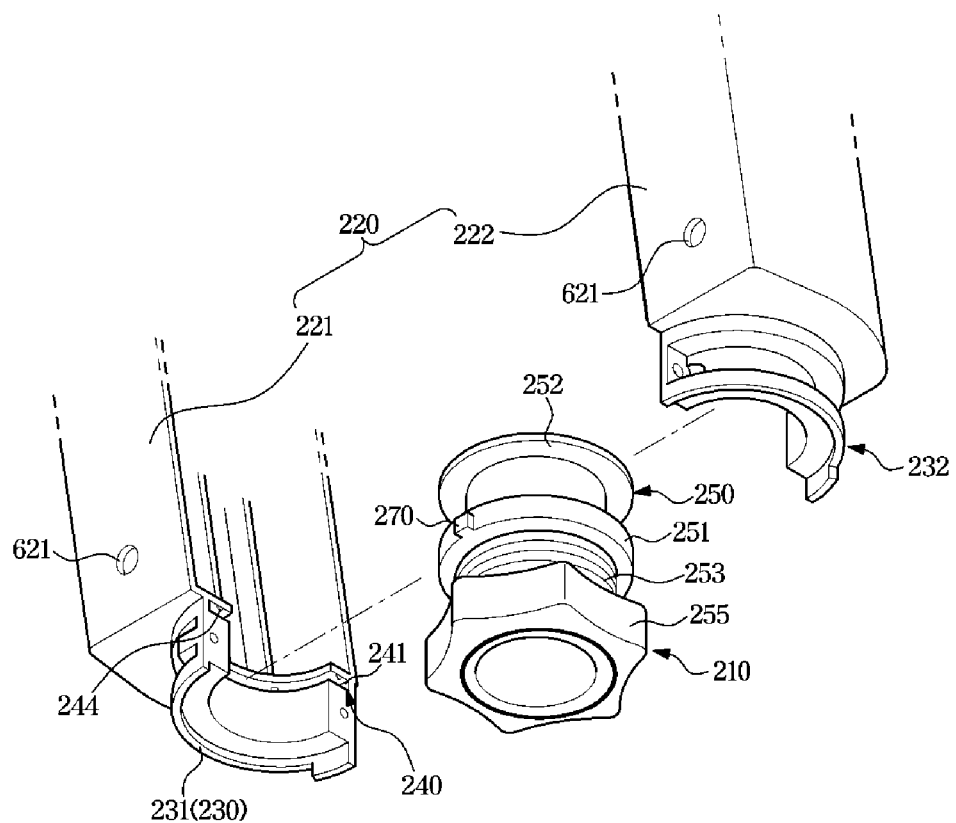
FIG. 6 is an exploded perspective view illustrating a rotating device of the water outlet unit according to the embodiment of the disclosure.
Figure 7:
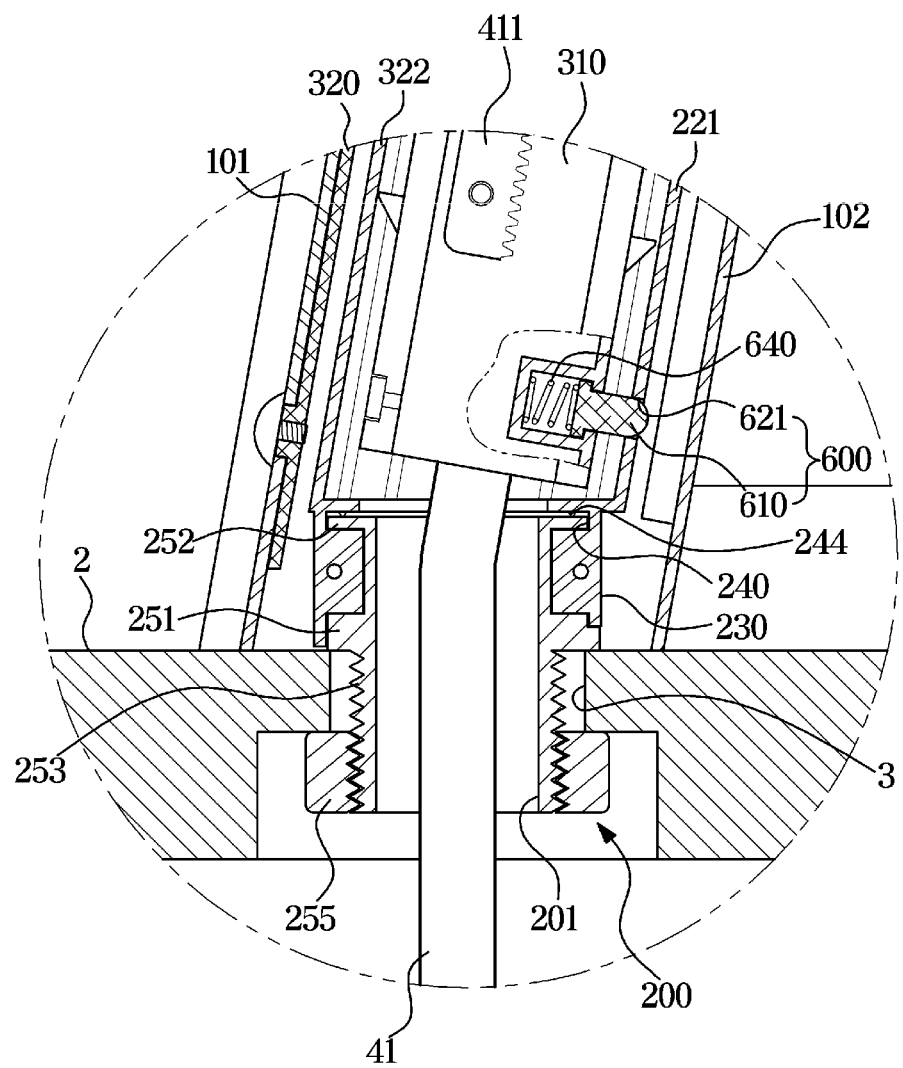
FIG. 7 is an enlarged view of part B of FIG. 4, which shows the rotating device according to the embodiment of the disclosure.
Figure 8:
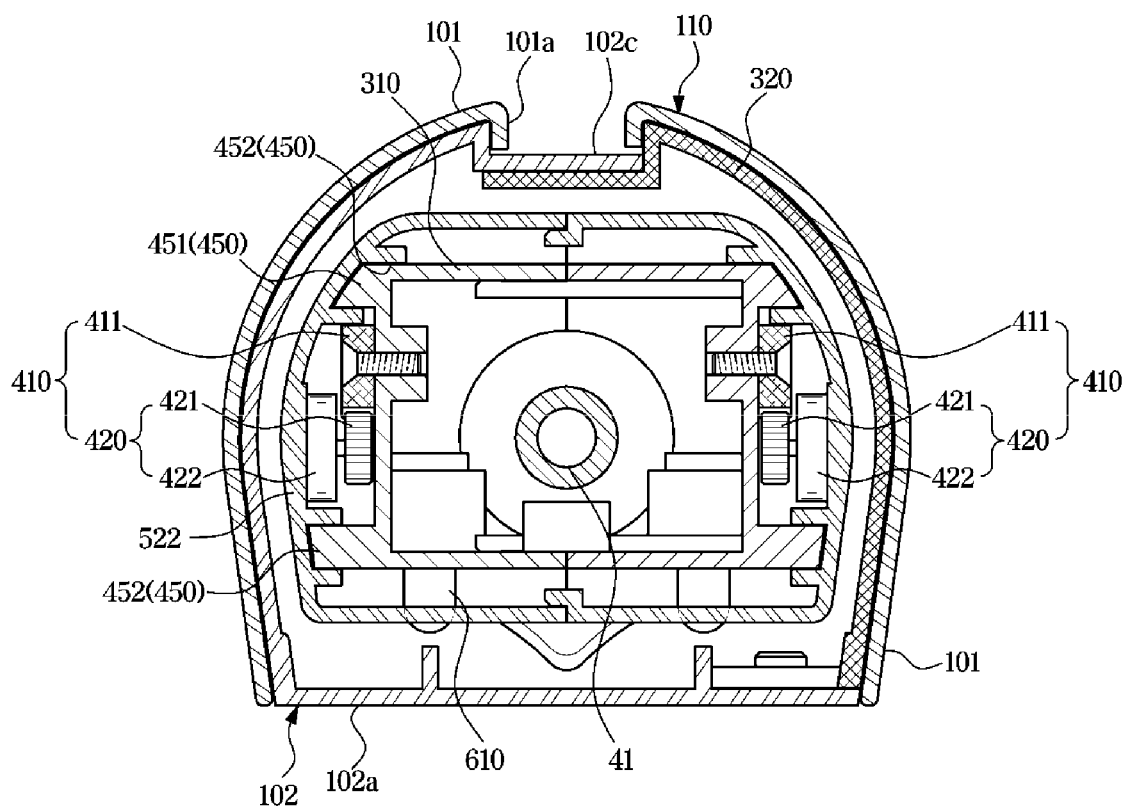
FIG. 8 is a cross-sectional view taken along line portion C-C' of FIG. 4, which shows a moving device of the water outlet unit according to another embodiment of the disclosure.

FIG. 4 is an exploded perspective view illustrating the water outlet unit according to the embodiment of the disclosure, FIG. 5 is a cross-sectional view taken along line A-A' of FIG. 2, which shows a cross-section of the water outlet unit of the water purifier according to the embodiment of the disclosure, FIG. 6 is an exploded perspective view illustrating a rotating device of the water outlet unit according to the embodiment of the disclosure, and FIG. 7 is an enlarged view of part B of FIG. 4, which shows the rotating device according to the embodiment of the disclosure;

Referring to FIGS. 4 to 7, the water outlet unit 100 may include the case 110. The case 110 is provided to form the external appearance of the water purifier 1. The case 110 includes a front case 102 forming a front surface and one side surface of the water purifier 1, a rear case 101 coupled to the front case 102 to form a rear surface and the other side surface of the water purifier 1, and a top case 103 forming an upper surface of the water purifier 1.

The water outlet unit 100 may be disposed on the front case 102. The front case 102 may include a first front cover 102a forming a front surface of the front case 102 and a second front cover 102b extending to one side of the first front cover 102a.

The first front cover 102a may include a water outlet cover 102d formed by at least a portion thereof protruded forward. The water outlet cover 102d may include a water outlet cover 102d formed by an upper portion of the first front cover 102a bent and extending. The water outlet cover 102d may be integrally formed with the upper side of the first front cover 102a. The water outlet cover 102d may be formed to protrude forward of the first front cover 102a. The water outlet cover 102d may be provided with the water outlet nozzle 104. The water outlet nozzle 104 is connected to the first pipe 41 to receive purified water from the water purifier body 10. The water outlet nozzle 104 may be protruded forward from the first front cover 102a. The water outlet nozzle 104 may be formed to be connected to the first pipe 41. The water outlet nozzle 104 may be formed to be directed toward a lower side of the water outlet cover 102d so that clean water may be supplied from the upper side to the lower side.

The second front cover 102b may be formed to extend at one side of the first front cover 102a. At least a portion of the second front cover 102b may include a curved surface.

A rear case coupling portion 102c for coupling with the rear case 101 is provided at a rear side of the front case 102. The rear case coupling portion 102c may be formed lengthwise along the front case 102.

The rear case 101 may be coupled to the front case 102. The rear case 101 may be provided to form the rear surface and the other side surface of the water purifier 1. The rear case 101 may be formed in an oval shape. At least a portion of the rear case 101 may be formed with a curved surface to correspond to the second front cover 102b.

The rear case 101 is coupled to at least a portion of the front case 102 to form a space in which the rotating device 200 and the adjusting device 300 may be installed. An upper portion of the rear case 101 may be formed to protrude forward so as to correspond to the water outlet cover 102d of the front case 102.

The rear case 102 is provided at a rear side thereof with a coupling hole 101a corresponding to the rear case coupling portion 102c of the front case 102. The coupling hole 101a may be elongated to correspond to the rear case coupling portion 102c.

The water outlet unit 100 may be rotated left and right by the rotating device 200 provided in the space between the front case 102 and the rear case 101. In addition, the height of the water outlet unit 100 may be adjusted by the adjusting device 300 provided in the space between the front case 102 and the rear case 101.

The top case 103 coupled to the upper side of the front case 102 and the rear case 101 is provided to form the upper surface of the water purifier 1.

The top case 103 may be provided with the manipulator 140 for controlling the water purifier body 10. The manipulator 140 may include a button 141 and a display 142.

The button 141 of the manipulator 140 may be provided in a push or touch method. The button 141 may be provided so that the user may selectively use the function of the water purifier 1. The button 141 is provided so that the water purifier body 10 may receive a water outflow signal. The manipulator 140 may further include a printed circuit board (PCB) (not shown) and a valve (not shown) connected to the button 141.

The display 142 may be provided to display various pieces of information of the water purifier 1. Information indicating clean water, cold water, or hot water may be displayed on the display 142. The display 142 may be physically and electrically connected to the PCB. A user may manipulate information displayed on the display 142 using the button 141 or the like.

The rotating device 200 provided to enable the case 110 to be rotated with respect to the kitchen worktable 2 may include a fixed bracket 210 and a rotating bracket 220 provided to be rotated relative to the fixed bracket 210.

The fixed bracket 210 and the rotating bracket 220 of the rotating device 200 are each formed at the center thereof with a hollow that the first pipe 41 may pass through.

The fixed bracket 210 of the rotating device 200 may be provided to be fixed to the installation portion 3 of the kitchen worktable 2. The fixed bracket 210 may be provided with a rotation support portion 250 formed in a cylindrical shape and having a through hole 201 at the center thereof. The fixed bracket 210 may include the rotation support portion 250 formed in a cylindrical shape. The rotation support portion 250 includes a support bracket 251 formed in a ring shape to be supported on the installation portion 3 of the kitchen worktable 2. The support bracket 251 may be integrally formed with the center of the rotation support portion 250. The support bracket 251 may be formed to be extended to protrude outward of the rotation support portion 250. At least one surface of the support bracket 251 may be supported by the installation portion 3 while in contact with the installation portion 3. The rotation support portion 250 may include a support screw portion 253 extending from a lower side of the support bracket 251. A support member 255 may be coupled to the support screw portion 253. The support member 255 may be rotatably coupled to the support screw portion 253. The support member 255 may be provided on the support screw portion 253 movably upward and downward by rotation. The support member 255 and the support bracket 251 may support the installation portion 3 in the upper side and lower side direction with the installation portion 3 interposed therebetween to thereby fix the fixed bracket 210 to the kitchen worktable 2.

The fixed bracket 210 may include a rotation guide 252 that extends upward from the rotation support portion 250 and is provided to guide rotation of the rotating bracket 220. The rotation guide 252 may be provided on the upper end of the rotation support portion 250.

The rotating bracket 220 is provided to rotate relative to the fixed bracket 210. The rotating bracket 220 may be provided to rotate relative to the rotation guide 252 of the fixed bracket 210. The rotating bracket 220 may include a rotating body 230 having a rotation groove 240 corresponding to the rotation guide 252. The rotating body 230 may be disposed at the lower end of the rotating bracket 220. The rotation groove 240 of the rotating body 230 is coupled to the rotation guide 252 of the fixed bracket 210, and the rotating body 230 being guided by the rotation guide 252 may be rotated. The rotating bracket 220 connected to the rotating body 230 may be rotated relative to the fixed bracket 210.

The rotating bracket 220 may include a first rotating bracket 221 and a second rotating bracket 222 coupled to the first rotating bracket 221. The first rotating bracket 221 and the second rotating bracket 222 are provided to be coupled to each other, and in a space formed by the combination of the first rotating bracket 221 and the second rotating bracket 222, a moving bracket 310 of the adjusting device 300 may be installed.

The first rotating bracket 221 and the second rotating bracket 222 may be provided at respective lower ends thereof with a first rotating body 231 and a second rotating body 232, respectively. Each of the first and second rotating bodies 231 and 232 may be formed in a semicircular shape. The semicircular first and second rotating bodies 231 and 232 may be coupled to each other to form a cylindrical shape. The first rotating body 231 and the second rotating body 232 may form a rotation groove 240 corresponding to the rotation guide 252 in cooperation with each other. The first rotating body 231 may form a first rotation groove 241 and the second rotating body 232 may form a second rotation groove 242. The first rotation groove 241 and the second rotation groove 242 may be connected to form a circular shape.

The first rotation groove 241 and the second rotation groove 242 may be formed with a contact portion 244 protruding so as to make a linear or point friction with the rotation guide 252. The contact portion 244 may include one or more protrusion protruding from the rotation groove 240. The contact portions 244 may be disposed to be spaced apart from each other at predetermined intervals on the rotation groove 240. The contact portion 244 may minimize the frictional load between the rotating body 230 (i.e., the rotating bracket 220) and the rotation guide 252 (i.e., the fixed bracket 210) while increasing the sensation of rotation when the water outlet unit 100 rotates.

With the rotating device 200, the water outlet unit 100 may be rotated in the left and right directions, so that the position of the water outlet nozzle 104 may be shifted in various directions, thereby improving the convenience of a user using the water purifier 1.

In the embodiment of the disclosure, the rotating bracket 220 is illustrated as being rotatable 360 degrees with respect to the fixed bracket 210, but the scope of the disclosure is not limited thereto. For example, the fixed bracket 210 may further include a stopper 270 provided to limit the rotation of the rotating bracket 220.

The first rotating bracket 221 and the second rotating bracket 222 may each include a guide (hereinafter, referred to as second guides 452) formed in the longitudinal direction thereof. The second guides 452 may be formed on the respective insides of the first rotating bracket 221 and the second rotating bracket 222. The second guide 452 is provided to guide the upward and downward movement of the moving bracket 310 of the adjusting device 300 which will be described below.

The moving bracket 310 is coupled to the inside of the first rotating bracket 221 and the second rotating bracket 222, and the moving bracket 310 may be connected to at least a portion of the case 110.

The moving bracket 310 may be connected to the case 110 through a connecting bracket 320. The connecting bracket 320 is provided to be connected to the front case 102.

The connecting bracket 320 may be provided to cover one side of the front case 102. The connecting bracket 320 may be provided between the front case 102 and the rear case 101. The connecting bracket 320 may include a case fixing portion 321 for fixing the connecting bracket 320 to the front case 102. One side of the connecting bracket 320 may be fixed to the front side of the front case 102 by the case fixing portion 321. The other side of the connecting bracket 320 may be fixed to the rear side of the front case 102. A first fixing portion 331 is formed on the other side of the connecting bracket 320. The first fixing portion 331 corresponds to a second fixing portion 332 formed on the rear case coupling portion 102c of the front case 102. The connecting bracket 320 is fixed to the front case 102 by the first fixing portion 331 and the second fixing portion 332.

The connecting bracket 320 may include a moving bracket fixing portion 340 that allows the connecting bracket 320 to be fixed to a connecting bracket fixing portion 350 of the moving bracket 310. The connecting bracket 320 may be fixed to the connecting bracket fixing portion 350 formed on an upper portion of the moving bracket 310.

The connecting bracket 320 is provided to connect the moving bracket 310, the front case 102, and the rear case 101 to each other. The connecting bracket 320 is provided so that the front case and the rear case 101 are moved upward and downward in connection with upward and downward movement of the moving bracket 310.

In addition, the connecting bracket 320 is provided to connect the case 110, the rotating bracket 220, and the moving bracket 310 to each other such that the moving bracket 310 provided in the rotating bracket 220 rotates when the rotating bracket 220 rotates, and the front case 102 and the rear case 101 are rotated in connection with the rotation of the moving bracket 310.

The case 110, the rotating bracket 220, and the moving bracket 310 may be connected to each other by the connecting bracket 320. Accordingly, when the rotating bracket 220 is rotated, the moving bracket 310, the case 110, and the water outlet unit 100 may be rotated at the same time.

Figure 9:
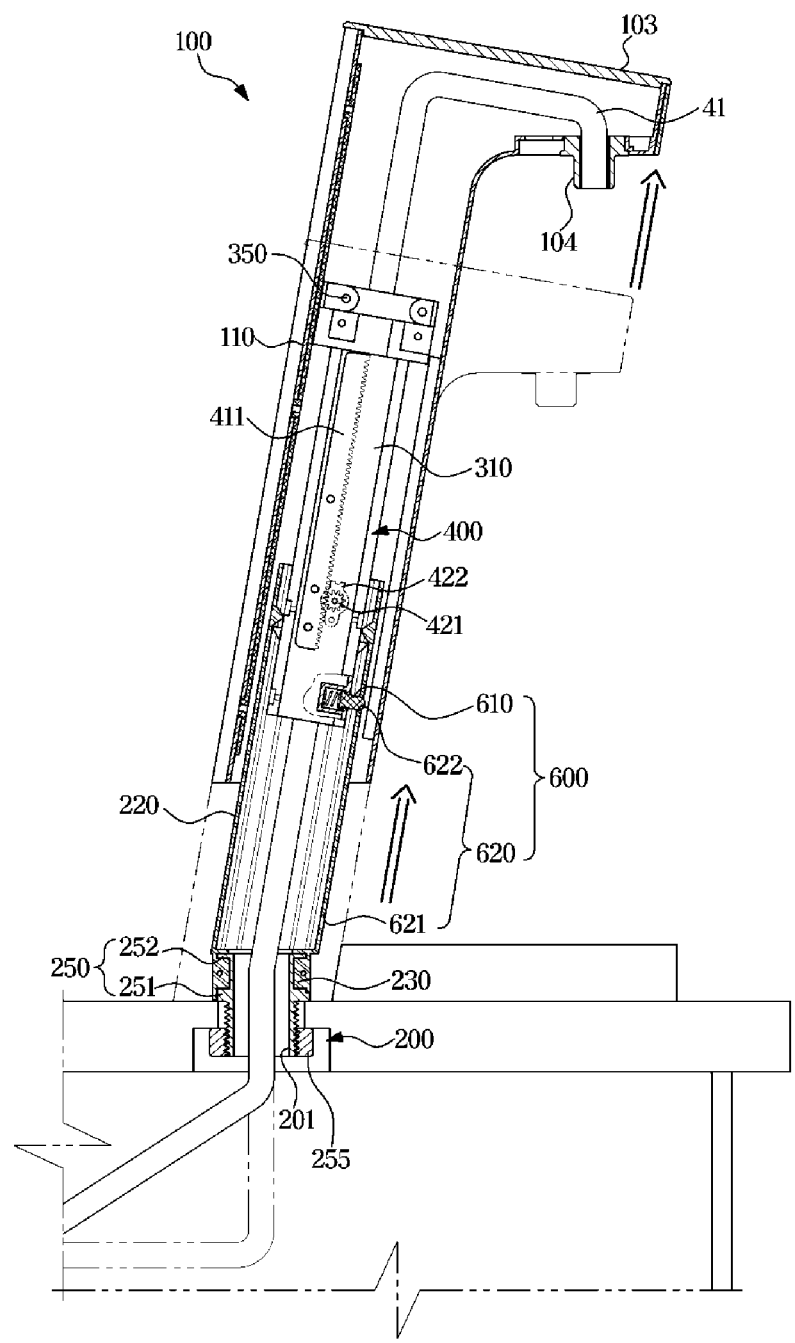
FIG. 9 is a view showing a state in which the height of the water outlet unit is adjusted by the moving device according to another embodiment of the disclosure.
Figure 10:
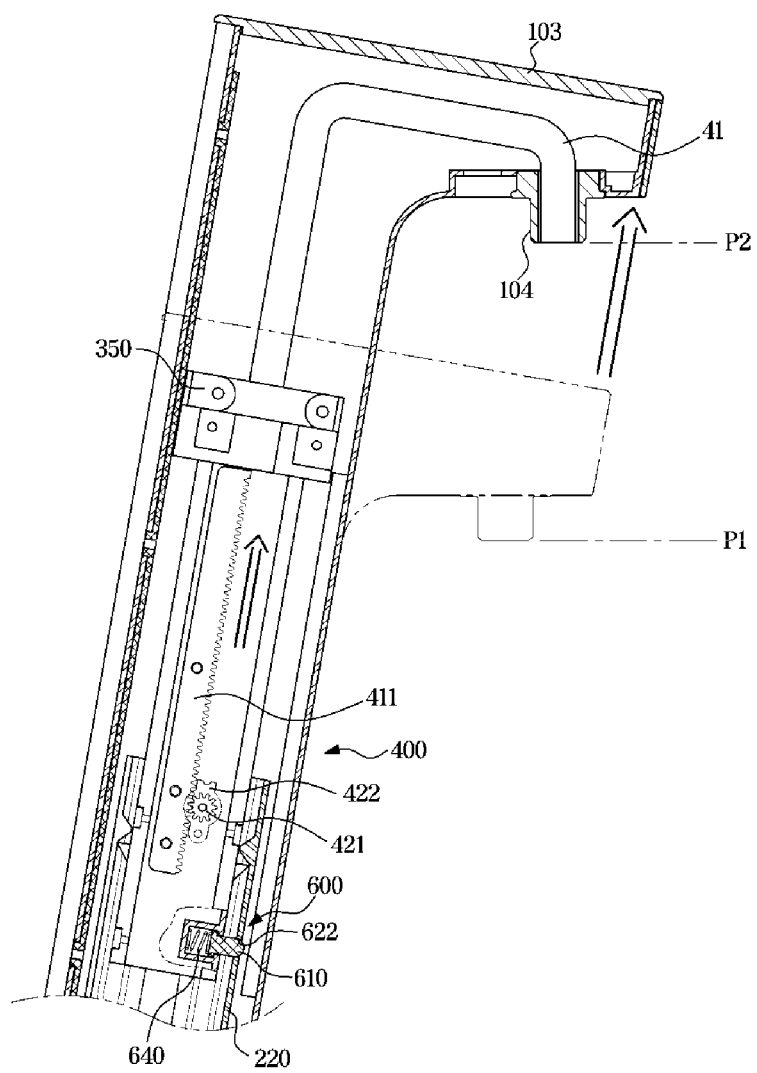
FIG. 10 is a view showing the water outlet unit with an adjusted height and the moving device according to another embodiment of the disclosure.

FIG. 9 is a view showing a state in which the height of the water outlet unit is adjusted by the moving device according to another embodiment of the disclosure, and FIG. 10 is a view showing the water outlet unit with an adjusted height and the moving device according to another embodiment of the disclosure. FIGS. 1 to 8 are referred to reference numerals of components not shown in FIGS. 9 and 10.

Referring to FIGS. 9 to 10, the adjusting device 300 may include the moving bracket 310 and a driving portion 400 provided to move the moving bracket 310 upward and downward.

The moving bracket 310 is provided to be movable upward and downward inside the rotating bracket 220. The moving bracket 310 may be formed in a substantially quadrangular shape and may include a first guide 451 corresponding to the second guide 452 of the rotating bracket 220 at all four corners. The first guide 451 may be formed in a shape corresponding to the second guide 452 so that the moving bracket 310 is moved upward and downward by being guided by the second guide 452. The first guide 451 and the second guide 452 are each illustrated as being formed in four units thereof, but the scope of the disclosure is not limited thereto. For example, a plurality of first guides and a plurality of second guides may be formed at positions corresponding to each other.

The driving portion 400 provided to move the moving bracket 310 upward and downward with respect to the rotating bracket 220 may include a first gear portion 410 formed on the moving bracket 310 and a second gear portion 420 provided on the rotating bracket 220 to correspond to the first gear portion 410.

The second gear portion 420 may be disposed on each of the first rotating bracket 221 and the second rotating bracket 222. The first gear portion 410 may be disposed on one side and the other side of the moving bracket 310 so as to correspond to the second gear portion 420.

The first gear portion 410 may include a rack 411 provided in the longitudinal direction of the moving bracket 310. The rack 411 may be disposed on at least one surface of the moving bracket 310 in the longitudinal direction of the moving bracket 310.

The second gear portion 420 may include a pinion 421 corresponding to the rack 411. The second gear portion 420 may be disposed on the rotating bracket 220. The pinion 421 is engaged with a gear of the rack 411 and rotates relative to the gear, to move the rack 411 upward and downward.

The second gear portion 420 may further include a rotation damper 422 provided to increase sensitivity during upward and downward movement of the first gear portion 410. The rotation damper 422 may be provided to be engaged with the rack 411 to reduce the upward and downward movement speed of the rack 411.

The moving bracket 310 may further include a roller 440 that facilitates movement between the moving bracket 310 and the rotating bracket 220. The roller 440 may be disposed at one side of the first guide 451. The roller 440 may be disposed to be linearly moved along the second guide 452 of the rotating bracket 220.

The moving bracket 310 may further include a position fixing portion 600 provided to fix the position of the case 110. The position fixing portion 600 is provided to fix the position of the moving bracket 310. The position fixing portion 600 may include a holder 610 installed to be elastically supported on the moving bracket 310 and a holder hole 620 formed in the rotating bracket 220 to correspond to the holder 610.

The holder 610 may be elastically supported by an elastic member 640 at a lower portion of the moving bracket 310. The holder 610 may be provided to be elastically supported in a direction from the inside to the outside of the moving bracket 310. The holder 610 is provided to be inserted into the holder hole 620 formed in the rotating bracket 220.

The holder hole 620 may include a first holder hole 621 and a second holder hole 622 positioned above the first holder hole 621.

The first holder hole 621 is located at a lower side of the rotating bracket 220, and the second holder hole 622 is located at an upper side of the rotating bracket 220.

Therefore, the first holder hole 621 allows the moving bracket 310 to be fixed at a first position P1, and the second holder hole 622 allows the moving bracket 310 to be fixed at a second position P2 higher than the first position P1.

When the moving bracket 310 is fixed at the second position P2, the case 110 is located at the second position P2, and the water outlet nozzle 104 is also located at a position higher than the first position P1.

By the rotating device 200 and the adjusting device 300, the water outlet unit 100 may be provided to be rotated in the left and right direction and moved in the upward and downward direction, so that the water outlet nozzle 104 may also be moved in various directions and positions, thereby improving the convenience of a user using the water purifier 1.

Figure 11:
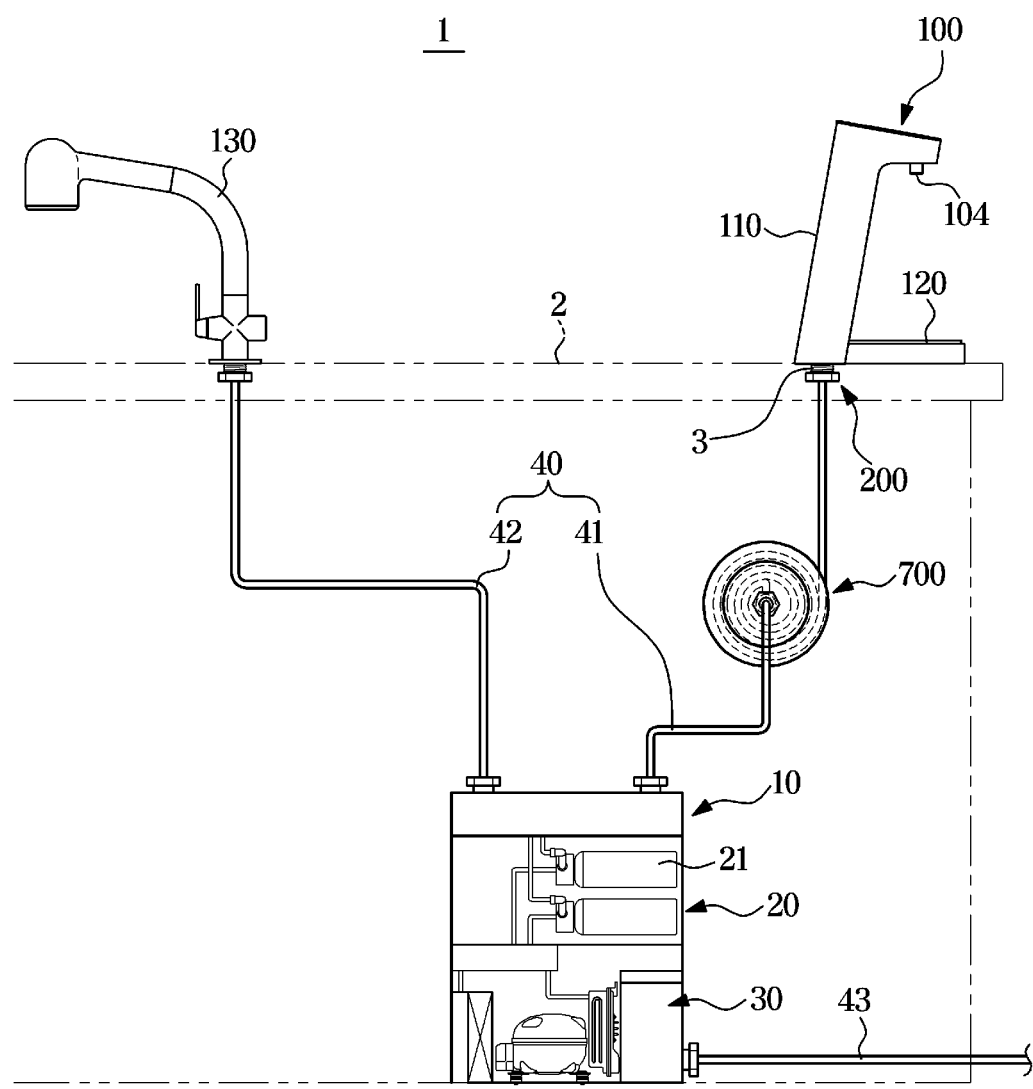
FIGS. 11 to 13 are views illustrating a pipe fixing device of the water outlet unit according to another embodiment of the disclosure.
Figure 12:
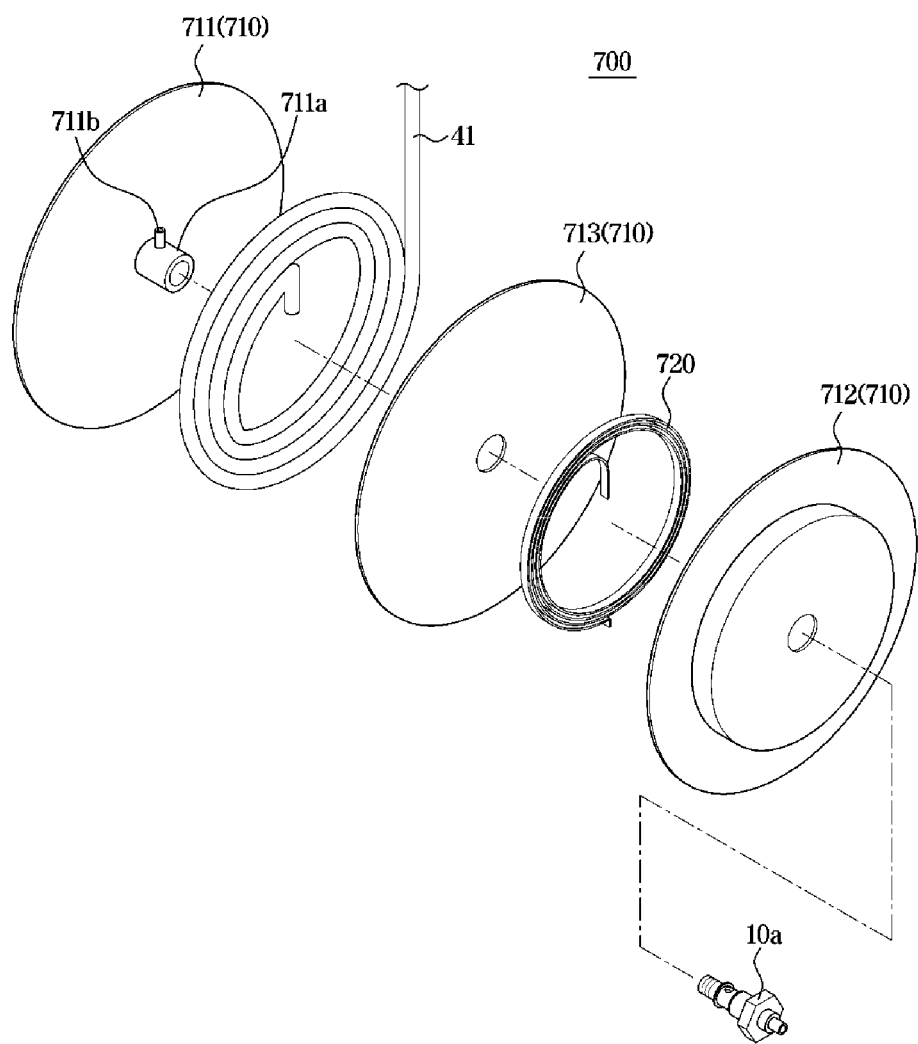
Figure 13:
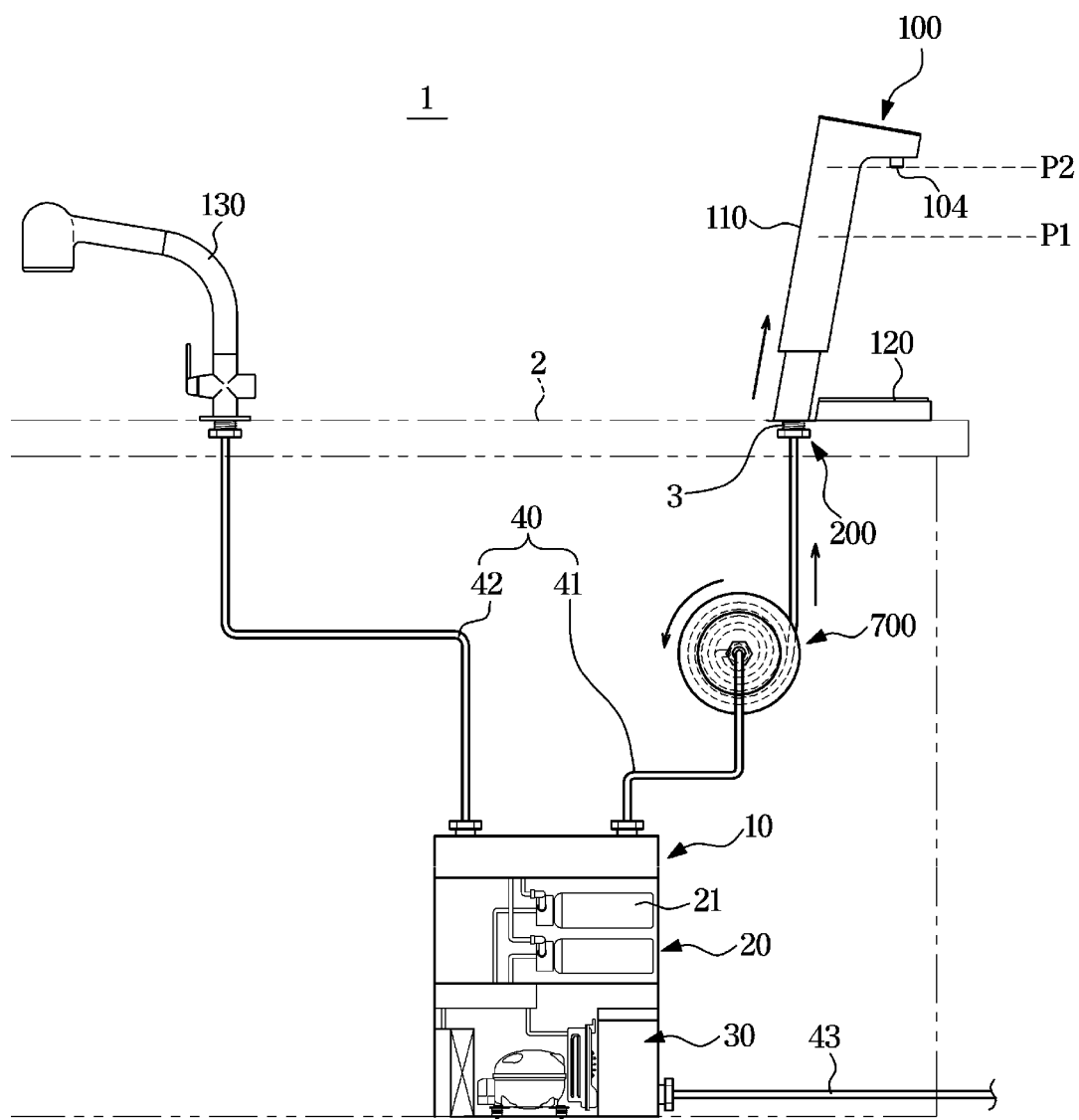

FIGS. 11 to 13 are views illustrating a pipe fixing device of the water outlet unit according to another embodiment of the disclosure. FIGS. 1 to 10 are referred for reference numerals of components not shown in FIGS. 11 to 13.

Referring to FIGS. 11 to 13, the water outlet unit 100 may further include a pipe fixing device 700.

The pipe fixing device 700 is provided to fix the pipes 41 and 42. The pipe fixing device 700 may be installed so that the lengths of the pipes 41 and 42 are varied.

The pipe fixing device 700 may be disposed inside the kitchen worktable 2. The pipe fixing device 700 is provided to fix the first pipe 41 connected to the water outlet unit 100 installed above the kitchen worktable 2.

The pipe fixing device 700 may be disposed between the water purifier body 10 and the water outlet unit 100. The pipe fixing device 700 may be installed on at least one of the water purifier body 10 or the kitchen worktable 2.

The water outlet unit 100 may be moved in the upward and downward direction by the adjusting device 300. The position of the water outlet nozzle 104 may also be shifted upward or downward by the upward and downward movement of the water outlet unit 100. When the water outlet nozzle 104 is moved, the first pipe 41 also needs to be moved upward or downward.

The pipe fixing device 700 is provided so that the length of the first pipe 41 is variable. The pipe fixing device 700 includes a reel member 710 in which the pipe 41 is wound and stored, a central shaft 711a passing through the center of the reel member 710 and serving as a center of rotation of the reel member 710, and a torque spring 720 provided at one side of the reel member 710 to elastically support the rotation of the reel member 710 in one direction.

The first pipe 41 may be wound and stored in the reel member 710. One end of the first pipe 41 may be connected to the water purifier body 10. The other end of the first pipe 41 may be connected to the water outlet nozzle 104 of the water outlet unit 100.

The reel member 710 includes a first reel member 711 provided at one side and a second reel member 712 disposed to be opposite to the first reel member 711, and the first reel member 711 may be provided with a connection pipe 711b to which the first pipe 41 is connected. The connection pipe 711b may be provided on the central shaft 711a. The first pipe 41 may be connected to a connection valve 10a provided in the main body 10 through the central shaft 711a.

A plate 713 supporting the first pipe 41 may be provided between the first reel member 711 and the second reel member 712. The torque spring 720 may be installed on the plate 713. The torque spring 720 may be installed to elastically support the first pipe 41.

The water outlet nozzle 104 may be moved to the first position P1 or the second position P2 according to the position of the water outlet unit 100. When the position of the water outlet nozzle 104 is shifted, the length of the first pipe 41 connected to the water outlet nozzle 104 may be varied.

When the water outlet nozzle 104 is located in the first position P1, the first pipe 41 is provided in a state of being stored in the reel member 710. When the water outlet nozzle 104 is moved to the second position P2 higher than the first position P1, the first pipe 41 needs to be lengthen to have a length longer than that with the first position P1. That is, the first pipe 41 is drawn out from the reel member 710 and moved.

Conversely, when the water outlet nozzle 104 is moved from the second position P2 to the first position P1, the first pipe 41 is wound back to the reel member 710. In this case, the reel member 710 may be returned by the elasticity of the torque spring 720.

Figure 14:
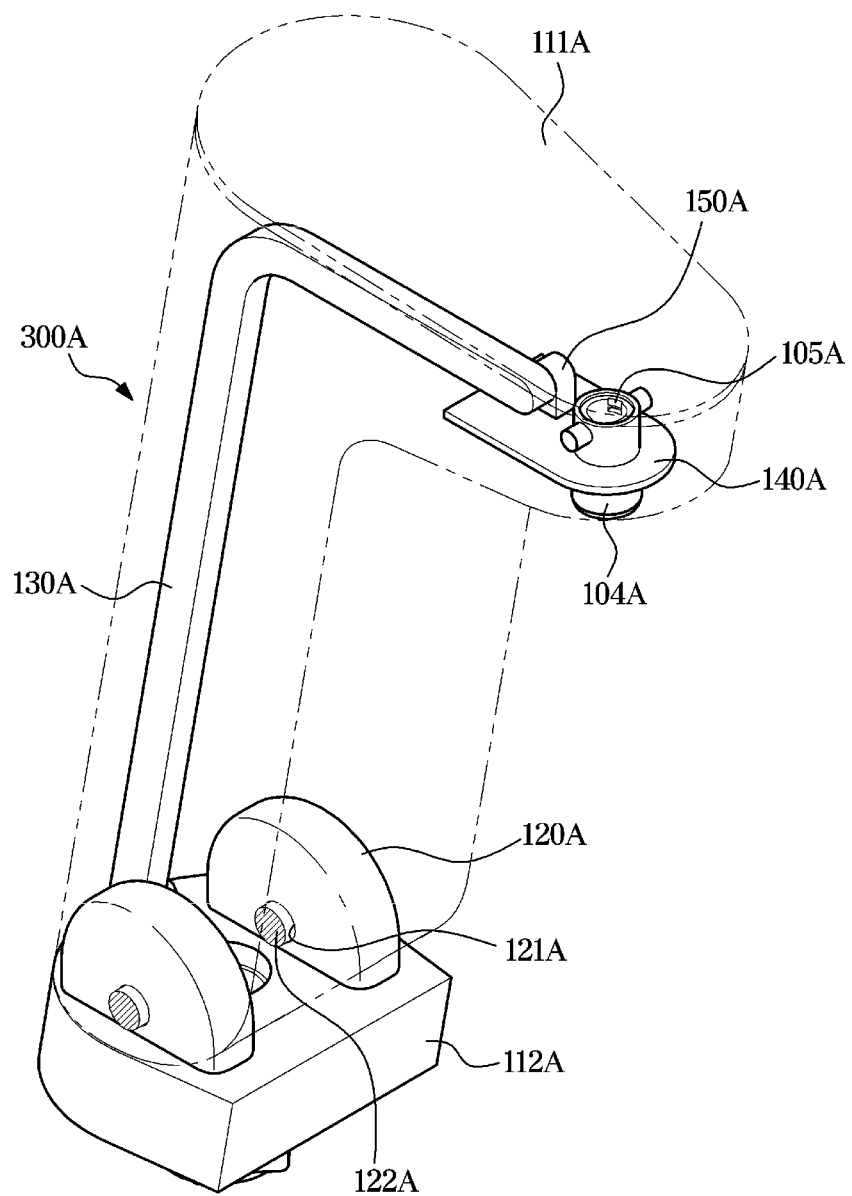
FIGS. 14 to 16 are views illustrating a tilting device of the water outlet unit according to still another embodiment of the disclosure.
Figure 15:
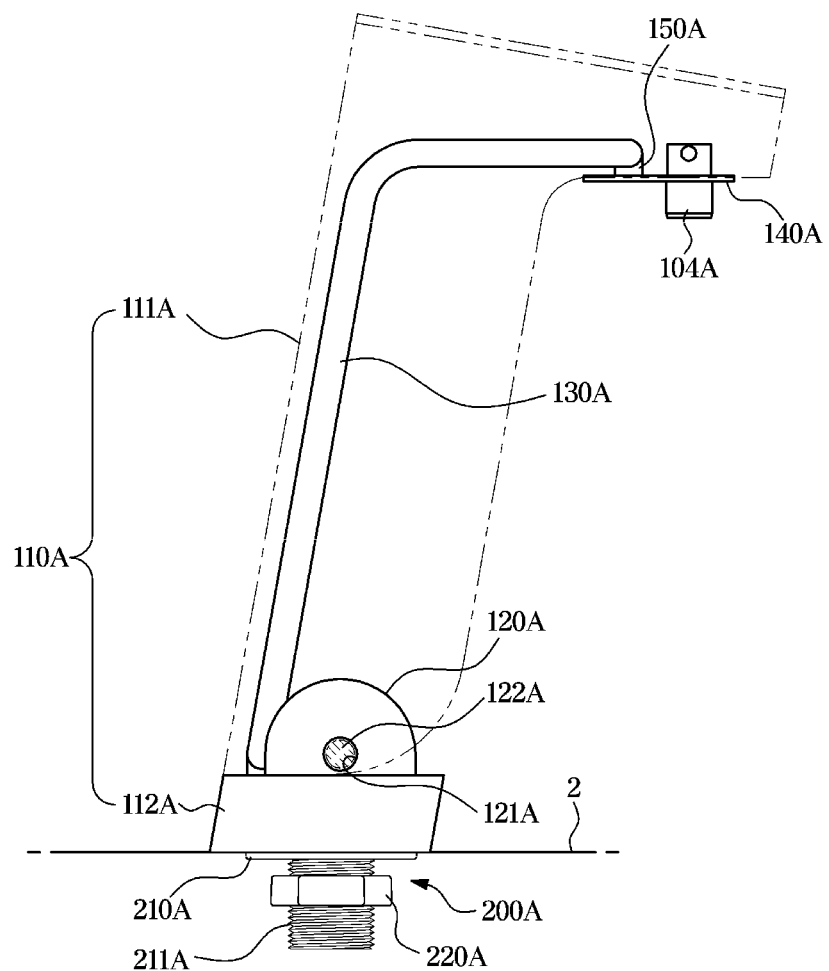
Figure 16:
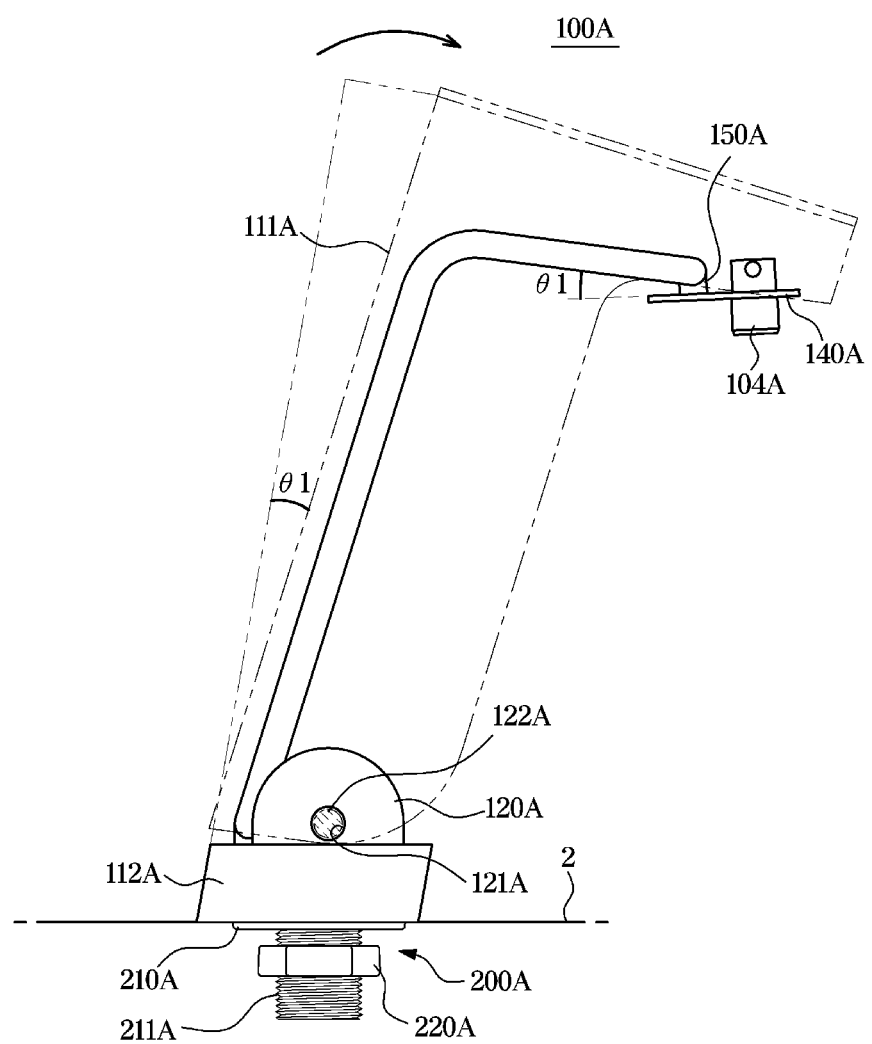

FIGS. 14 to 16 are views illustrating a slope device of a water outlet unit according to still another embodiment of the disclosure. FIGS. 1 to 10 are referred to reference numerals of components not shown in FIGS. 14 to 16.

Referring to FIGS. 14 to 16, a water outlet unit 100A may include a tilting device 200A.

The water outlet unit 100A may include a case 110A. The case 110A is provided to form the external appearance of the water purifier 1. The water outlet unit 100A may be installed on the kitchen worktable 2 so as to be rotated by a rotating device 200A.

The rotating device 200A includes: a rotating bracket 210A provided at a center thereof with a hollow that allows the first pipe 41 to pass therethrough and having a rotation support portion 211A: and a fixed bracket 220A installed on the rotation support portion 211A.

The case 110A may include a first case 111A and a second case 112A. The first case 111A may be installed on the upper side of the second case 112A. A water outlet nozzle 104A may be provided in the first case 111A. The water outlet nozzle 104A may be disposed at an upper portion of the first case 111A.

The second case 112A is disposed at the lower end of the first case 111A. The second case 112A may be connected to the rotating device 200A. The second case 112A may be installed on the kitchen worktable 2.

A tilting device 300A may be provided in the case 110A. The tilting device 300A may be provided inside the case 110A. The tilting device 300A may be provided between the first case 111A and the second case 112A. The tilting device 300A is provided so that the first case 111A may be tilted at a predetermined angle with respect to the second case 112A.

The tilting device 300A includes a hinge bracket 120A provided on the second case 112A. The hinge bracket 120A may be provided with a hinge hole 121A. The tilting device 300A may include a hinge shaft protrusion 122A provided in the first case 111A so as to correspond to the hinge hole 121A of the hinge bracket 120A.

The hinge shaft protrusions 122A of the first case 111A may be disposed on inner surfaces of both sides of the first case 111A, respectively. The hinge shaft protrusion 122A of the first case 111A is coupled to the hinge hole 121A of the second case 112A such that the first case 111A is tilted at a predetermined angle θ with respect to the second case 112A.

The first case 111A is rotated so as to be tilted at a predetermined angle θ with respect to the second case 112A. The hinge shaft protrusion 122A of the first case 111A may be rotatably coupled to the hinge hole 121A formed in the hinge bracket 120A of the second case 112A. In the embodiment of the disclosure, the first case and the second case are illustrated as being rotatably coupled to each other by the hinge bracket, the hinge shaft protrusion, and the hinge hole, but the scope of the disclosure is not limited thereto.

The tilting device 300A may further include a guide bracket 130A provided to guide rotation of the first case 111A. The guide bracket 130A is disposed inside the first case 111A, and is provided to connect the first case 111A to the hinge bracket 120A.

The guide bracket 130A may be formed in a shape corresponding to the first case 111A. The guide bracket 130A may be formed in an approximately '¬' shape. The guide bracket 130A may be connected to a nozzle support bracket 140A in which the water outlet nozzle 104A is provided. The nozzle support bracket 140A is provided so that the water outlet nozzle 104A is kept horizontal with respect to the floor when the first case 111A is tilted at a predetermined angle θ. The nozzle support bracket 140A may be rotatably connected to the guide bracket 130A through a nozzle hinge portion 150A. The nozzle hinge portion 150A may be formed at an upper side of the nozzle support bracket 140A. The nozzle hinge portion 150A is rotatably connected to the guide bracket 130A. The water outlet nozzle 104A is formed at a lower portion of the nozzle support bracket 140A, and a pipe connection portion 105A that connects the pipe 41 to the water outlet nozzle 104A is formed at an upper portion of the nozzle support bracket 140A. The water outlet nozzle 104A and the pipe connection portion 105A are formed to be connected to each other to communicate with each other.

By the nozzle support bracket 140A, the water outlet nozzle 104A is located to be horizontal with the floor even when the first case 111A is tilted. Thus, clean water may be discharged in a straight line downward from the water outlet nozzle 104A.

When the case 110A is tilted at a predetermined angle θ by the tilting device 300A, the position of the water outlet nozzle 104A is lowered by a predetermined angle θ compared to the original position. As such, since the position of the water outlet nozzle 104A is variable, the user convenience is improved.

As is apparent from the above, the position of the water outlet unit and the position of the residual water tray of the water purifier can be freely changed, thereby improving the usability.

In addition, since the position of the water outlet unit of the water purifier is variously changed, the water purifier can be installed to correspond to various installation environments.

In addition, a rotating device provided to make a point or line contact enables the water purifier to smoothly operate without a sensation of being caught during rotation of the water outlet unit, thereby preventing abrasion of parts and improving the durability.

The water purifier can provide a smooth sensation of operation, thereby enhancing the product quality.

Although specific embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

What is claimed is:

1. A water purifier comprising:
a water purifier body;
a water outlet connectable to the water purifier body, the water outlet including:
a case forming an external appearance of the water outlet, the case including:
a front case to form a front surface and one side surface of the water purifier,
a rear case to form a rear surface, the rear case and the front case being coupleable to each other to form a space,
a top case to form an upper surface of the water purifier,
a manipulator configured to control the water purifier body, and
a water outlet nozzle configured to receive purified water from the water purifier body and to supply the purified water to an outside of the water purifier body according to input via the manipulator while the water purifier body is connected to the water outlet;
an adjusting device configured to adjust a height of the water outlet, the adjusting device including a moving bracket connected to at least a portion of the case and a driving portion including a roller configured to guide the moving bracket being moved along an upward and downward direction;
a connecting bracket connecting the case to the moving bracket, the connecting bracket is configured to cause the case to move upward and downward in connection with the moving bracket being moved along the upward and downward direction; and
a rotating device arrangeable in the space formed while the front case and the rear case are coupled to each other so that while the rotating device is arranged in the space, the rotating device is between the water purifier body and the water outlet, the rotating device including:
a fixed bracket fixable to an object to thereby couple the case of the water outlet to the object, and
a rotating bracket rotatable relative to the fixed bracket while the fixed bracket is fixed to the object so that as the rotating bracket is rotated, the case is rotated and positions of the front case, the rear case, the top case and the water outlet nozzle are changed,
wherein a height of the case, a height of the manipulator, and a height of the water outlet nozzle are adjustable by the adjusting device,
wherein the driving portion includes a first gear portion provided on the moving bracket, a second gear portion provided on the rotating bracket to be engaged with the first gear portion and a damper configured to adjust a moving speed of the moving bracket.

2. The water purifier of claim 1, wherein the rotating device and the adjusting device are installed inside the case.

3. The water purifier of claim 1, wherein the fixed bracket includes:
a rotation support portion formed in a ring shape and provided to be fixed to a counterpart object; and
a rotation guide extending from the rotation support portion and provided to guide rotation of the rotating bracket.

4. The water purifier of claim 3, wherein the rotating bracket includes a rotating body formed with a rotation groove corresponding to the rotation guide.

5. The water purifier of claim 4, wherein the rotating body includes a contact portion formed to protrude to make a line or point friction with the rotation guide.

6. The water purifier of claim 1, further comprising a position fixing portion provided to keep the moving bracket in position,
wherein the position fixing portion includes a holder elastically installed on the moving bracket and a holder hole corresponding to the holder and provided to separate the moving bracket from the rotating bracket.

7. The water purifier of claim 6, wherein the position fixing portion includes a first fixing portion configured to separate the moving bracket from the rotating bracket at a first position, and a second fixing portion configured to separate the moving bracket from the rotating bracket at a second position spaced apart from the first position, wherein the first fixing portion is provided below the second fixing portion.

8. The water purifier of claim 1, wherein the driving portion further includes a guide correlated with the moving bracket and the rotating bracket to guide the moving bracket along the upward and downward direction.

9. The water purifier of claim 1, further comprising a stopper configured to limit a rotation of the rotating bracket.

10. The water purifier of claim 1, wherein the water purifier body includes a filter unit including at least one filter, and a heat exchange unit connected to the filter unit to cool or heat the purified water.

* * * * *